Jan. 5, 1943.  C. B. MOORE  2,307,229
CONTROL APPARATUS
Filed Jan. 4, 1940   3 Sheets-Sheet 1

INVENTOR
COLEMAN B. MOORE
BY
ATTORNEY

Jan. 5, 1943.       C. B. MOORE         2,307,229
CONTROL APPARATUS
Filed Jan. 4, 1940        3 Sheets-Sheet 2
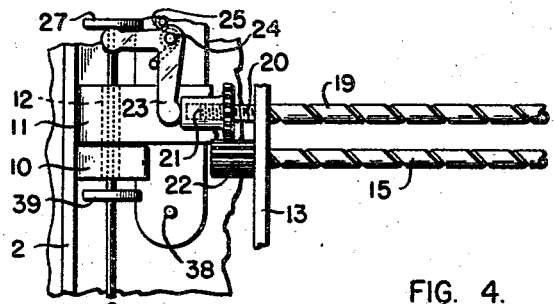
FIG. 4.
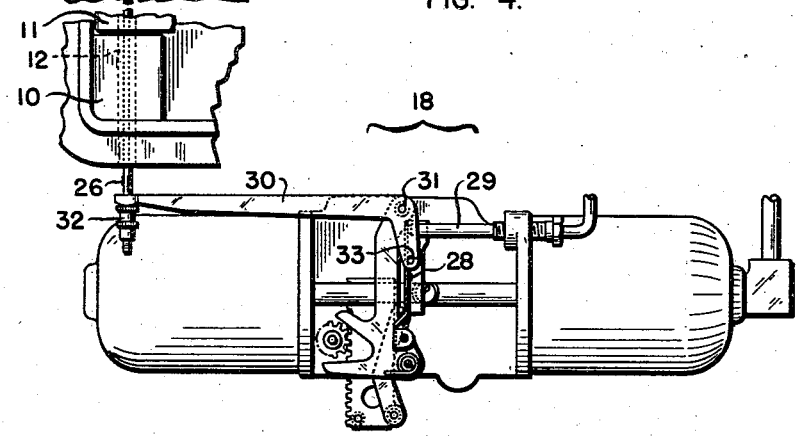
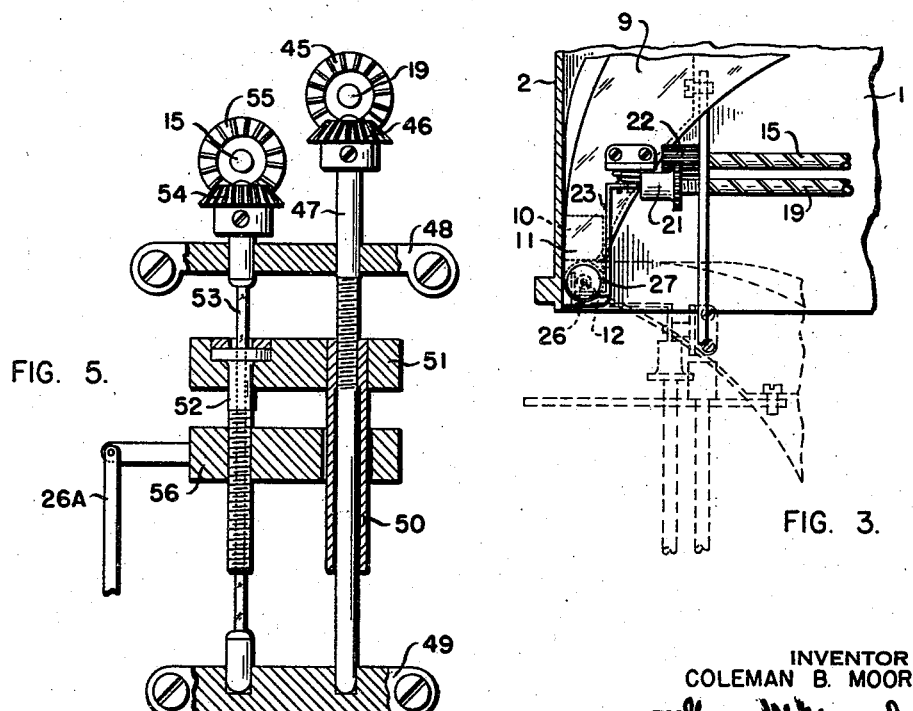
FIG. 5.
FIG. 3.
INVENTOR
COLEMAN B. MOORE
BY
ATTORNEY Jan. 5, 1943. C. B. MOORE 2,307,229
CONTROL APPARATUS
Filed Jan. 4, 1940 3 Sheets-Sheet 3
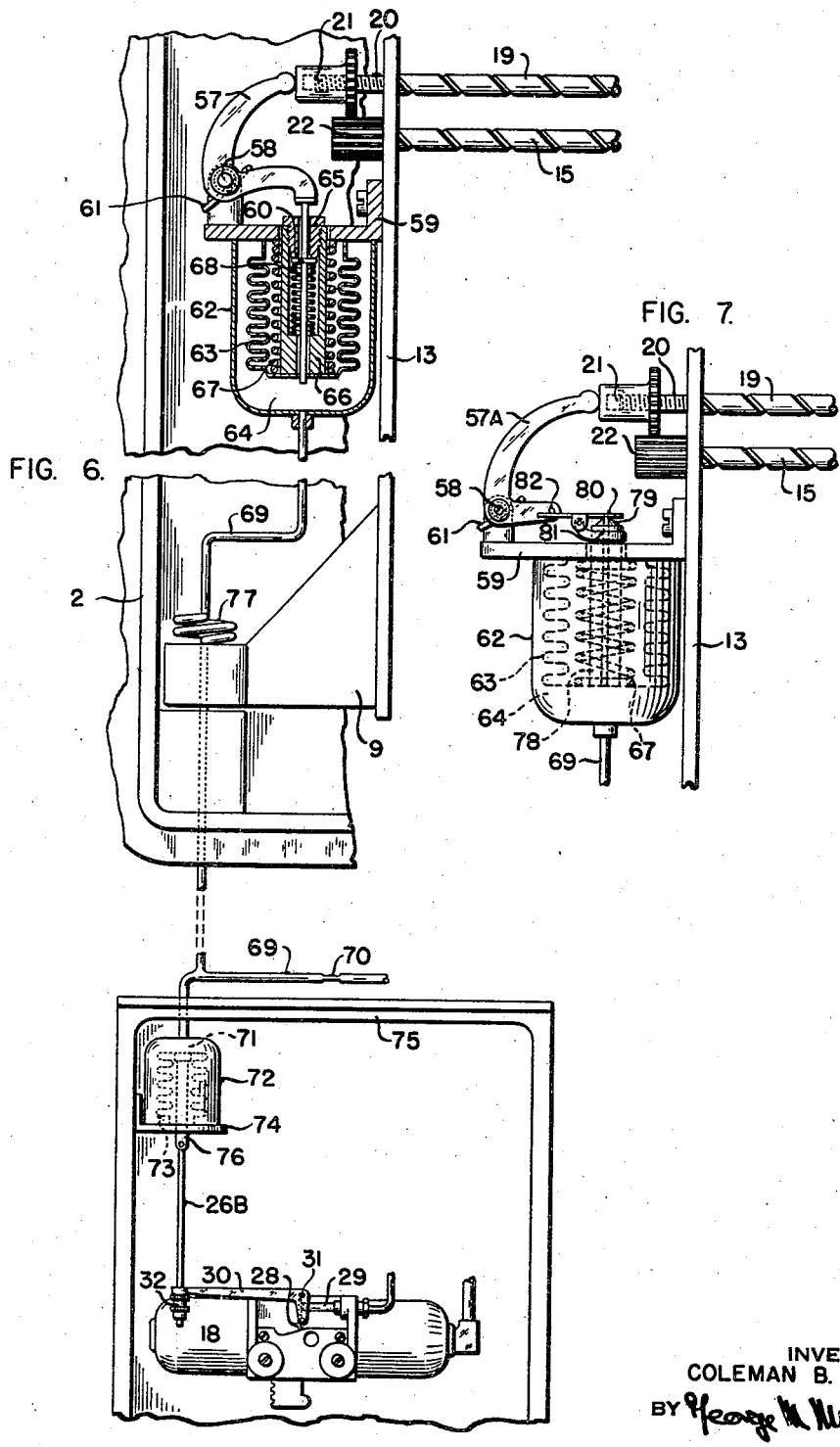
INVENTOR
COLEMAN B. MOORE
BY
ATTORNEY Patented Jan. 5, 1943

2,307,229

UNITED STATES PATENT OFFICE 2,307,229

CONTROL APPARATUS

Coleman B. Moore, Carroll Park, Pa., assignor to The Brown Instrument Company, Philadelphia, Pa., a corporation of Pennsylvania Application January 4, 1940, Serial No. 312,385

12 Claims. (Cl. 236—84)

The present invention relates to control instruments and more particularly to that type of instrument which is known as a potentiometer air controller. It has previously been customary in instruments of this type to have an element moved by the potentiometer measuring unit to a position corresponding with the value of a condition. This element was adapted to cooperate with a cam shaped member that was positioned along the path of the element at a point corresponding to the value at which it was desired to maintain the value of the condition being measured and controlled. As the element moved relative to the cam member the latter was moved and through an air controller unit varied the pressure of a motive fluid that was applied to the diaphragm of a valve in the line of a condition changing medium. This type of operation while being entirely satisfactory for most purposes has the disadvantage that a throttling action on the control pressure could only be obtained over that portion of the range of the instrument equal to the length of the cam member. When the element moved by the potentiometer was shifted to either side of the cam member the air pressure supplied to the diaphragm of the control valve was such that the valve was either completely open or closed.

It is an object of my invention to provide an improvement in a potentiometer air controller type of instrument which will permit the air pressure supplied to the control valve to be throttled throughout the entire range of the potentiometer unit. It is a further object of my invention to provide a control mechanism of the above type in which full range throttling is obtained in a simple and efficient manner. By the use of my apparatus the air controller unit may be accurately operated in accordance with the value of the condition as measured by the potentiometer unit either when the air control unit is attached to the casing of the potentiometer, as is almost universally the procedure at present, or when the air controller unit is located at a distance from the potentiometer case. This latter feature is of great utility since it permits a location of the potentiometer unit and its cooperating air controller unit at separate points rather than requiring that they be mounted together as has previously been the case.

It is a further object of my invention to give proportional adjustments to an air controller unit throughout the entire range of operation of a potentiometer unit that is associated therewith to form a potentiometer air controller instrument.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 3 is a partial plan view showing the hinge construction of the casing and its relation to the other parts;

Fig. 4 is a detail view of one form of my invention for adjusting the air controller from the potentiometer;

Fig. 5 is a modification thereof;

Fig. 6 is a view showing a means for adjusting the air controller when it is located at a distance from the potentiometer; and Fig. 7 is a modified form of transmitting unit to be used with Figure 6.

Figure 1:
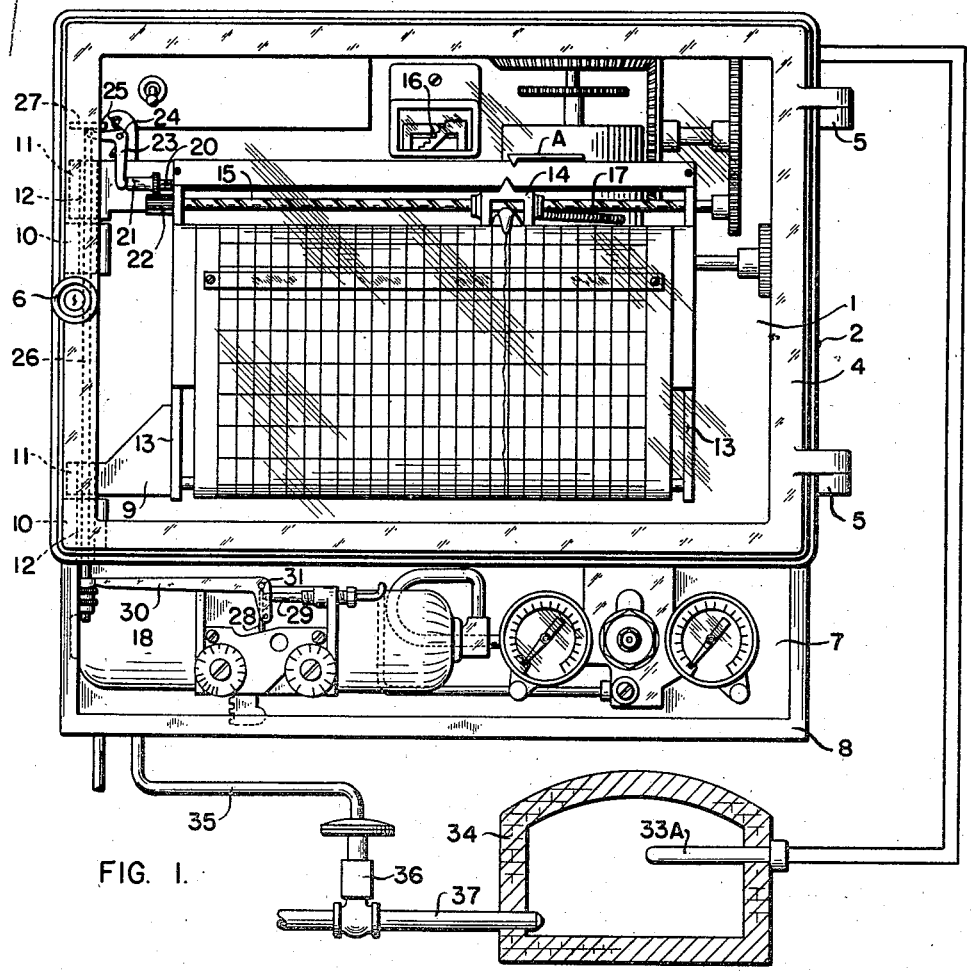
Fig. 1 is a front elevation of control apparatus including a pneumatic control mechanism external to, but attached to the casing of a potentiometer mechanism.

The apparatus shown in the drawings comprises a self-balancing recording potentiometer measuring and control instrument, normally received in the chamber 1 of an instrument casing 2 of rectangular outline. The casing 2 is formed with a doorway at its front side, which is normally closed by a door 4 connected at one side to the casing body by hinges 5. The door 4 is provided at its opposite side with a knob 6, and is ordinarily provided with locking means including a keyhole in the knob 6, for locking the door in its closed position. The apparatus shown in the drawings also comprises a so-called air actuated controller located in a casing compartment 7, directly beneath the chamber 1. The compartment 7 is closed at its upper end by the bottom wall of the casing 2, and has its rear, bottom and end walls formed by a casing part 8 detachably connected to the casing 2. The front wall of the compartment 7 is formed by a removable panel or wall plate member (not shown).

The potentiometer instrument mechanism is mounted on a supporting arm 9, which is normally within the chamber, and is hinge connected to the casing body 2 adjacent the end of the space remote from the door hinges 5. The hinge connection between the casing and supporting arm 9, comprises overlapping hinge ears 10 and 11, carried by the casing body 2 and arm 9, respectively, and a hinge pintle 12. The framework of the potentiometer instrument mechanism comprises main end plates of members 13 secured to the arm 9 and respectively adjacent to the opposite end walls of the space when the arm 9 is within that space in the normal condition of the apparatus, illustrated in Figs. 1 and 3. When the door 4 is opened, the arm 9 and the instrument mechanism supported by it may be swung out of the casing as shown in Fig. 3 in dotted lines.

The potentiometer instrument shown comprises a recorder carriage 14 movable horizontally between the end plates 13 in one direction or the other by the rotation of a helically grooved or screw threaded shaft 15 journalled in the end plates 13 and in threaded engagement with the carriage 14. A potentiometer instrument of the type shown, comprises a relay mechanism controlled by the deflection of a galvanometer pointer 16 for automatically adjusting a potentiometer measuring circuit resistance 17 when and as required to rebalance the measuring circuit, and for rotating the shaft 15 to adjust the carriage 14 longitudinally of the shaft into positions corresponding to the different values of the quantity measured, and the variations of which produce deflections of the galvanometer pointer 16. The mechanism by which the potentiometer measuring circuit is rebalanced and the shaft 15 is rotated to adjust the carriage 14 need not be further described herein as its particular form constitutes no part of the present invention, which is adapted for use with measuring and control instruments of very different forms. It is noted, however, that the particular potentiometer instrument mechanism shown, is of the form employed in the "Brown potentiometer" instrument which is in extensive commercial use, and the characteristics of which, in the precise form herein illustrated, are disclosed in Patent 1,946,280 issued to Thomas R. Harrison.

The control provisions of the instrument include an air control unit 18 that may take the form of the well known "Brown Air-O-Line" unit that is shown and described in detail in Patent 2,125,081 issued to me on July 26, 1938. The specific details of that mechanism form no part of the present invention which is concerned more particularly with the combination of the air controller unit and the potentiometer unit and the manner in which the former is operated in accordance with measurements made by the latter.

A control table A whose function is to indicate the value at which it is desired to maintain the conditions being controlled is mounted on a second helically threaded shaft 19 that is journalled in the frame 9. One end of this shaft 19 projects through the end plate 13 and is provided with a threaded portion 20 upon which is mounted a gear 21 having a hollow hub projecting therefrom. The gear 21 is in mesh with an elongated gear 22 attached to an extension of the shaft 15. Therefore as the shaft 15 is rotated due to a change in the value of the condition the gear 22 will rotate gear 21 and cause it to move to the right or left along shaft 19. The motion of gear 21 is imparted to a bell-crank 23, pivoted at 24, and biased by a spring 25 so that its vertical arm bears against the gear. This arrangement takes up any play between the parts.

A rod 26 extends through the center of the hinge pin 12 and through a small opening in the bottom of the case 2 into the sub-case 8. This rod is provided at its upper end with an enlargement 27 that bears on the horizontal arm of bell-crank 23 and is held in engagement therewith by the force of gravity or a spring or both. Therefore, oscillating movements of the bell-crank are translated into vertical movements of the rod 26. This movement is used to adjust a flapper 28 of the air control unit 18 relative to a bleed nozzle 29 therein by means of a lever 30 that is pivoted at 31. This lever bears on an adjustable abutment 32 on the lower end of rod 26 and is provided with a pin 33 that moves the flapper relative to the nozzle. Such movement, in a manner fully set forth in the above mentioned Patent 2,125,081, operates to apply a control impulse of a magnitude proportional to the magnitude of the condition being measured to a control valve in the line of a condition changing medium.

In the operation of the instrument a thermocouple 33A is inserted in, for example, a furnace 34 whose temperature it is desired to record and control. This thermocouple is connected to the potentiometer unit and as the temperature of the furnace varies the E. M. F. generated by the thermocouple will cause the galvanometer pointer 16 to deflect. Through the above described mechanism shaft 15 will be rotated in accordance with the temperature change and, through gears 21 and 22 will move shaft 26 up and down. This movement will turn lever 30 on its pivot to shift the flapper 28 with respect to nozzle 29. The change in this relation will adjust the air control unit 18 to vary the pressure supplied through pipe 35 to the diaphragm of a valve 36. The valve 36 is located in a line 37 through which fuel is supplied to a burner in the furnace. If the original temperature change was upward the fuel supply will be reduced to reduce the furnace temperature and vice versa.

In order to determine the value at which the instrument will maintain the temperature of the furnace, the shaft 19 is rotated, either by hand or automatically, until the control table A is at a point transversely of the chart corresponding to that value. This, due to the threaded portion 20 of the shaft 19, will adjust the gear 21 axially so that some predetermined relation will exist between the flapper 28 and nozzle 29. Thereafter during the operation of the instrument as the value of the furnace temperature changes the shaft 15 will be rotated accordingly to shift gear 21 on shaft 19 and thereby vary the predetermined relation between the flapper and nozzle. The threads on the various shafts are so arranged that if the temperature is falling and the control point is shifted down scale at the same rate, the gear 21 will not have any axial movement.

As shown in the drawings a movement of gear 21 to the left will raise rod 26 and cause a movement of flapper 28 away from nozzle 29 to reduce the pressure in the latter and the pressure applied to the diaphragm of valve 36. If it is desired to produce a movement of the flapper toward the nozzle for the same direction of movement of the gear 21 it is only necessary to invert the lever 23 and have it pivot around a pin 38 which is provided for that purpose and have the horizontal arm of the lever 23 work against a collar 39 on the rod 26.

Figure 2:
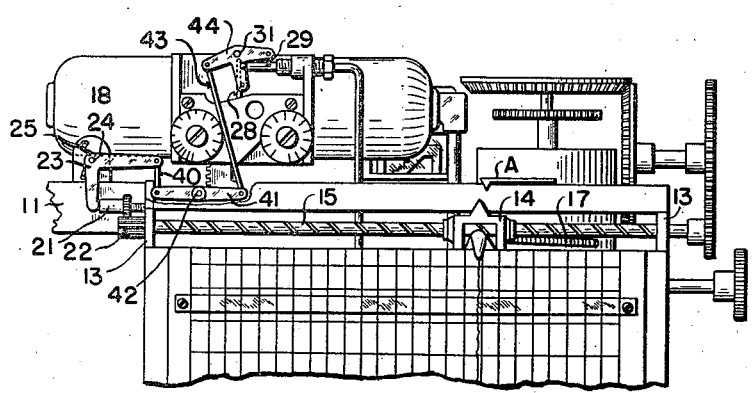
Fig. 2 is a front view of a similar construction in which the pneumatic control mechanism and potentiometer mechanism are located in the same casing.

There is shown in Figure 2 an arrangement in which the air control unit is mounted in the same case with the potentiometer unit. In this construction the bell-crank 23 is reversed in direction and has connected to its horizontal arm a link 40 whose other end is pivoted to the rock bar 41. This latter bar is pivoted at 42 and is connected by a link 43 to a flapper actuating lever 44. Therefore, as the value of the condition measured by the potentiometer unit changes the flapper 28 will be moved relative to the nozzle 29 to vary the control pressure in line 35 and the opening of valve 36.

The embodiment of Figure 5 accomplishes the same result that is obtained by the structure of Figure 4 but with a slightly different arrangement of parts. In this case the shaft 19 is provided on its end with a bevel gear 45 that meshes with a second similar gear 46 attached to the upper end of a shaft 47 which is journalled in brackets 48 and 49 that are attached to the frame 13 of the potentiometer unit. The shaft 47 is provided with a threaded portion that is in threaded engagement with a sleeve member 50 so that the latter is raised and lowered as the shaft 47 is rotated. Therefore, rotation of the shaft 19 to adjust the control point of the potentiometer unit moves the sleeve 50 and a block 51 attached thereto to some particular point. Journalled for rotation in the other end of the block is a threaded sleeve 52 which has a rectangularly shaped axial opening that slidably receives a rectangularly shaped shaft 53. This shaft is provided with circular portions on its ends, the lower of which is journalled in bracket 49 and the upper in bracket 48. Attached to the upper end of shaft 53 is a bevelled gear 54 which meshes with a similar gear 55 attached to the outer end of shaft 15. Therefore, as the shaft 15 rotates due to a change in the value of the condition being measured the shaft 53 will be rotated, and due to the co-action between that shaft and the bore in sleeve 52, the latter will be rotated. Surrounding sleeves 50 and 52 is a block 56 that is in threaded engagement with the latter. As this block is moved up and down due to rotation of sleeve 52 a link 26A attached thereto and the lever 30 of the air contol unit moves the latter to adjust flapper 28 relative to nozzle 29.

In the operation of this embodiment the shaft 19 is rotated until the control table A is at the position along the chart corresponding with the value at which it is desired to maintain the temperature of the furnace. This moves sleeve 50, carrying block 51, sleeve 52 and block 56 therewith, to a position corresponding to the control point. Thereafter as the shaft 15 rotates the block 56 will be moved up and down along the sleeve 52 and, through rod 26A and lever 30, move the flapper 28 relative to nozzle 29. This causes the air control unit 18 to vary the pressure applied to the diaphragm of valve 36 to control the fuel supplied through pipe 37 in accordance with the temperature of furnace 34.

The embodiments of the invention that have been described may be used when the air control unit of the invention is located adjacent the potentiometer unit of the control instrument. When, however, the air control unit is for some reason located at a distance from the potentiometer unit a remote transmitting system must be used between the two. Such systems are disclosed in Figures 6 and 7.

Referring first to Figure 6, there is shown a lever 57 corresponding to lever 23 of Figure 4, that is pivoted at 58 on a supporting bracket 59 which is in turn fastened to the framework 13. This lever is biased by a spring 61 in a clockwise direction so that one arm bears against the end of gear 21 and the other end bears against the upper end of the stem of a valve member 60 of a remote pneumatic transmitting unit. This transmitting unit consists of a cup shaped member 62 that is attached to the bracket 59 and which has in it a bellows 63 that is also attached at its open end to the bracket. The space between member 62 and the bellows forms a chamber 64 whose pressure is varied in accordance with the position of gear 21 and the value of the condition.

The pressure in chamber 64 is varied by throttling the leakage of air through an opening in the end wall of the bellows by changing the relative positions of the valve 60 and a valve seat 65 that is positioned in the upper end of a hollow post 66 which is in turn fastened to the end wall of the bellows. This post extends through an opening provided in the bracket 59. Bellows 63 is normally biased in a direction to reduce the volume of chamber 64 by a spring 67 and the valve 60 is normally biased toward its seat 65 by a spring 68. Normally valve 60 and seat 65 are so positioned that there is a small leakage of air between the two.

Air under a suitably regulated pressure is supplied through line 69, past a restriction 70, to the chamber 64, and to a second chamber 71 that is formed between a casing 72 and the outside of a bellows 73 that is preferably similar to the bellows 63. The casing 72 and bellows 73 are attached to a bracket 74 that is located in a housing 75 for the air control unit 18. This housing may be located at any desired point with respect to the potentiometer unit, connection between the two being made by the branched air line 69. Attached to the end wall of bellows 73, and extending through an opening in the bracket 74 is a link 76 that moves a rod 26B to operate lever 30 of the air control unit. A coiled portion 77 is made in the tube 69 so that the latter will not be injured when the potentiometer unit is swung out of its casing 2.

In the operation of this embodiment of the invention the lever 57 is moved around its fulcrum by the gear 21 upon a change being made in the control point setting of the potentiometer unit or upon a change in the value of the condition being measured, in a manner previously described. As, for example, lever 57 is moved clockwise valve 60 will be moved away from seat 65 permitting more air to escape from chamber 59. This reduces the pressure in the chamber, permitting the bellows 63 to expand under the action of spring 67 to move post 66 and valve seat 65 downwardly with respect to valve 60 until equilibrium is again established in the system with a lower pressure in chamber 64. As the pressure in chamber 64 is reduced the pressure in line 69 and chamber 71 will also be reduced. This permits bellows 73 to expand either under its own force or the force of a spring to move rod 26B upwardly to adjust the position of flapper 28 relative to nozzle 29. If lever 57 had moved counter-clockwise valve 60 would have moved toward seat 65 to cut off the flow of air therebetween. As a consequence pressure would increase in chambers 64 and 71. The former would contract bellows 63 moving seat 65 away from the valve 66 until equilibrium was established and the latter causing the bellows 73 to contract and move rod 26B downwardly.

In Figure 7 the same general arrangement is shown as is shown in Figure 6, the difference being in the type of valve mechanism that is used to vary the pressure in chamber 64. In this embodiment a post 78 that is attached to the end wall of bellows 63 is provided with a small cylindrical bore and terminates in a nozzle 79. A valve 80 for the nozzle is pivoted to an extension of a collar 81 that is attached to the post 78. The valve or flapper 80 is moved around its pivot by a pin 82 on the end of one arm of a lever 57A that is moved by gear 21. The chamber 64 is supplied with air through and connected to chamber 71 by the air line 69 as was the case in Figure 6.

In the operation of this embodiment a movement of lever 57A in, for example, a clockwise direction by gear 21 will move flapper 80 away from nozzle 79 and permit more air to escape from the nozzle. This operates to reduce the pressure in chambers 64 and 71 to permit bellows 73 to move rod 26B upwardly. The same reduction in pressure permits bellows 63 to elongate, moving post 78 downwardly until the flapper 80, acting under a gravity bias, moves toward nozzle 79 and reestablishes an equilibrium in the pressure of chamber 64. In like manner a counterclockwise movement of lever 57A will permit flapper 80 to move toward nozzle 79 to restrict the flow therethrough and increase the pressure in chamber 64. This increase is transmitted to chamber 71 and causes bellows 73 to contract to shift rod 26B downwardly. At the same time bellows 63 is contracted to move post 78 upwardly until the flapper 80 is again the correct distance away from nozzle 79 to establish equilibrium in the system.

From the above it will be seen that I have provided a practical and simple way of adjusting the air control unit from the potentiometer unit of a potentiometer air controller throughout the entire range of the potentiometer unit. It will also be seen that the adjustment can be made with equal ease and accuracy whether the two units of the control instrument are located adjacent each other or whether they are located some distance apart.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a potentiometer air control instrument comprising a potentiometer unit and an air control unit, the combination of means to adjust said control unit from said potentiometer through the full scale of the latter comprising a first shaft on said potentiometer unit rotated to a position corresponding to the value it is desired to maintain a variable condition, a second shaft on said potentiometer unit rotatable to various positions in accordance with the value of said condition, an element positioned in accordance with the rotative positions of said two shafts and means adjusted by said element to operate said air control unit to continuously modulate an air supply in all positions of the element.

2. In a control instrument a potentiometer unit to measure the value of a condition, an air control unit to control the value of said condition, means to produce a modulating action by said control unit continuously throughout the range of the potentiometer unit in accordance with the value of the condition as measured by the potentiometer unit comprising a pivoted lever, means to move one end of said lever in response to variations in the value of the condition, a connecting link moved by said lever and means connected to and operated by movement of said connecting link to adjust said control unit.

3. A control instrument comprising a measuring unit and a control unit, means to operate said control unit in response to measurements made by said measuring unit comprising a first shaft on said measuring unit rotated to a position corresponding to the desired value of a condition, a second shaft on said measuring unit rotatable to a position corresponding to the value of said condition, a member continuously moved by said second shaft as the latter is rotated throughout its range of movement in response to changes in said condition and means operated by said member to directly and continuously actuate said control unit to modulate an air supply for each position of said member.

4. In a control instrument the combination with a measuring unit and a control unit, of means to operate the latter in accordance with the value of a condition to be controlled as measured by the former comprising a first gear rotated in accordance with the value of the condition, a second gear rotated by said first gear, means to shift said second gear axially as it rotates, a pivoted lever having one arm biased into engagement with said second gear to be moved thereby as said gear moves axially, a member acted on by said lever, and means to actuate said control unit by said member.

5. In a control instrument comprising a measuring unit enclosed in a housing and a control unit enclosed in a separate housing the combination with means to actuate said control unit in accordance with the value of a condition as measured by said measuring unit throughout the entire range of the latter comprising a gear shifted axially to positions corresponding to the value of the condition, a lever operated thereby, a rod extending between the two housings and adapted upon movement thereof to operate said air control unit and means to move said rod upon operation of said lever.

6. In a control instrument comprising a measuring unit mounted on hinges in a housing and a control unit mounted in a seperate housing adjacent thereto, the combination with means to operate said control unit in accordance with the value of a condition as measured by said measuring unit comprising a rod extending between said housings and through the pivot point of the hinges in said first housing, means operated by movement of said rod to adjust the control unit and means to move said rod comprising a first element positioned in accordance with a desired value of the condition, a second element positioned in accordance with the present value of the condition, a member shifted axially by relative movement of said elements and means operated by said member to move said rod.

7. In a control instrument comprising a potentiometer unit and an air control unit located at a distance from each other, the combination with means to operate said air control unit in accordance with measurements of the value of a condition made by said potentiometer unit comprising a pneumatic device to actuate said air controller unit, a lever moved by said potentiometer unit to a given position for each value of the condition in the range of said potentiometer and means responsive to the movement to operate said pneumatic device continuously in accordance therewith.

8. In a control instrument comprising a measuring unit and a control unit, the combination of means to operate the latter throughout the entire range of the former comprising a first shaft rotated to a position corresponding to the desired value of a condition, a second shaft on said measuring unit rotated to a position corresponding to the present value of said condition, a gear threaded on said first shaft, a second gear meshing therewith attached to said second shaft whereby rotation of either shaft will produce axial movement of the first gear, a lever biased into engagement with said first gear to be moved as said gear moves, transmission means operated by said lever and means to adjust said control means by said transmission means.

9. In a control instrument comprising a measuring unit and a control unit located at a distance from each other, pneumatic means to operate said control unit continuously from said measuring unit comprising a lever to operate said control unit, pressure responsive means to move said lever, means to transmit a pressure from said measuring unit to said pressure responsive means, and mechanism operated by said measuring means to vary the pressure comprising an element moved in response to measurements made by said measuring means, a lever operated thereby, a supply of fluid pressure, and valve means to adjust said pressure operated by said lever.

10. In a potentiometer control instrument the combination of a measuring unit, an air control unit and means to produce a modulating action of the latter by the former continuously throughout its full range of movement comprising a first rotatable part adjusted to a position corresponding to the desired value of the condition, a second part rotated throughout the full range of the operation of the measuring unit to positions corresponding to the present value of the condition, a member jointly moved by the two parts, and means acted upon by said member to adjust said air control unit to different positoins of each position thereof.

11. In a potentiometer air control instrument comprising a potentiometer unit and an air control unit of a type to modulate an air supply continuously throughout its range, the combination of means to operate the air control unit continuously from the potentiometer unit through full scale movement of the latter comprwising a first part movable by said potentiometer unit to various positions depending upon the value of the condition being measured, a second part movable to positions corresponding to the value at which it is desired to maintain the condition being measured, a lever mechanism jointly operated by said two parts, a member shifted to various positions by said lever mechanism, and means directly connecting said air control unit and said member whereby the former will be operated by the latter to continuously modulate a supply of air under pressure.

12. In a control instrument having a potentiometer unit and an air control unit of a type to modulate an air supply continuously throughout its range, the combination of means to continuously operate the air control unit throughout the full range of operation of the potentiometer unit comprising a first part movable to a position proportional to the desired value of a condition, a second part movable by said potentiometer unit to positions proportional to the various values that the condition takes, a lever jointly moved by said two parts to a position corresponding to the respective positions of the parts, a mechanical connection between said lever and said air control unit whereby the latter will be operated to continuously modulate a supply of air under pressure in accordance with the condition value.

COLEMAN B. MOORE.